3,189,513
Patented June 15, 1965

3,189,513
TRACK RESISTANT SELF-EXTINGUISHING
COMPOSITION
Robert H. Calderwood, Hampton Township, Allegheny County, Harry R. Sheppard, Whitehall Boro, Charles R. Ruffing, Churchill Boro, and Ben A. Moreland, Wilkinsburg, Pa., assignors to Westinghouse Electric Corporation, East Pittsburgh, Pa., a corporation of Pennsylvania
No Drawing. Filed Nov. 14, 1960, Ser. No. 68,602
5 Claims. (Cl. 161—195)

This invention relates to resinous electrical insulating compositions and, particularly, the invention relates to resinous laminates characterized by improved arcing and flame resistance. Even more particularly, the invention relates to glass-polyester laminates having self-extinguishing properties and excellent resistance to tracking. The invention includes the resinous compositions themselves and laminates produced therefrom.

It is recognized in the art that electrical insulation may be installed in apparatus which operates in dirty and/or humid atmospheres. As a layer of dust and dirt accumulates on the surface of molded insulation separating two or more conductors, a conductive path may be formed. Where the voltage difference between the conductors is sufficiently high, a momentary flashover may occur. Whenever a flashover occurs, some of the resin on the surface of the insulating material may decompose and form a carbon track. Some of the resin may also erode away. With repeated discharges, breakdown of the insulation eventually occurs. The high resistance of a carbon track may also cause the insulation to become hot and even to catch fire, thus creating an additional operating hazard.

It is a primary object of this invention to provide an electrical insulation material which obviates the above-described problems.

Another object of the invention resides in the provision of a resinous laminate possessing desirable electrical insulating properties and characterized by improved resistance to tracking.

A further object of the invention is the provision of glass-polyester laminates which are self-extinguishing in character.

Other objects will become apparent from the following detailed description of the invention.

In its most generic embodiment, the invention relates to a glass-polyester laminate containing a chlorinated polyester resin, a non-chlorinated polyester resin, together with a relatively small amount of an ethylenically unsaturated monomeric material, and a filler material. The resinous composition is employed to embed and bond together two or more plies of material such as glass mat or the like material.

It was discovered, quite unexpectedly, that the presence of both the halogen and the monomeric material is required in order to provide improved resistance to flame and tracking. While the monomer, by itself, contributes good tracking resistance, the resinous laminates prepared therefrom burn quite freely. Furthermore, the presence in the resinous composition of halogen alone results in laminates having good flame resistance and self-extinguishing properties, but the laminates have unsatisfactory resistance to tracking.

The amount of chlorinated polyester resin required in the filler-containing resinous composition is within the range of about 8% to about 35% by weight thereof. The amount of non-chlorinated polyester resin is within the range of about 20% to about 35% by weight of the resin composition. The monomeric material required may be within the range of about 2% to about 10% by weight of the total composition. The monomer may suitably be present in the non-chlorinated polyester resin or it may be added to the mixture per se. Monomeric compounds which are required in the invention include acrylic and styrene monomers such as methyl methacrylate, ethyl methacrylate, and the like, as well as styrene, monostyrene, alpha methylstyrene, and the like monomers.

The chlorinated polyester resins which may be employed in accordance with the invention are those prepared from so-called Het anhydride and from tetrachlorophthalic anhydride. The preparation of these resins is disclosed in United States Patents Nos. 2,779,700 and 2,779,701, issued to P. Robitschek et al., and the disclosures of those patents are hereby incorporated in this description.

Briefly, the resins comprise Diels-Alder reaction adducts of hexahalocyclopentadiene esterified with a polyhydric alcohol or a polycarboxylic acid in the presence of a reactive unsaturated chemical ingredient such as, for example, maleic anhydride.

The chlorinated resinous compositions of this invention can be prepared by first effecting the esterification of the selected polycarboxylic acids with the desired polyhydric alcohols in the presence of the reactive unsaturated chemical ingredient, whereby an unsaturated polyester is formed; then mixing the resulting composition with the chosen copolymerizable olefinic cross-linking agent; and, thereafter, copolymerizing the mixture to form an insoluble, infusible polyester resin.

Another method which may be employed for producing resinous compositions of this invention comprises effecting the chemical addition of hexahalocyclopentadiene to less than the total theoretical number of olefinic linkages contained in an unsaturated polyester molecule. For example, by effecting the Diels-Alder reaction of one molecule of hexahalocyclopentadiene with more than one molecule of ethylene glycol maleate, a product is produced which contains the hexahalocyclopentadiene in chemical combination in the polyester chain and which also contains active unsaturation which is copolymerizable in the cross-linking reaction; the product so produced is then combined with the chosen olefinic cross-linking agent and thereafter copolymerized. Esterification of the desired ingredients may be effected in the presence of esterification catalyst and/or chain terminating agents, etc.

A preferred procedure involves introducing the selected ingredients to be esterified, in predetermined proportions, into a suitable esterification vessel provided with heating and/or cooling means, an agitator, means for maintaining an atmosphere of an inert gas such as nitrogen or carbon dioxide over the reaction mixture, means for removing water of esterification, an inlet, an outlet, and any other accessories necessary for the reaction. The charged reactants are blanketed with an inert atmosphere, then agitated and heated to effect the reaction for the specified period of time. After the desired degree of reaction has been attained, as conveniently determined by employing the acid number technique or measuring the amount of water liberated, the reaction mixture is cooled. The resulting product, if solid, and if prepared in accordance with the first procedure described, is broken up and then mixed with the olefinic cross-linking agent at room temperatures, preferably in the presence of a polymerization inhibitor.

If prepared in accordance with the second method, a hexahalocyclopentadiene is chemically added to a soluble unsaturated polyester molecule in an amount insufficient to react out all the double bonds in the polyester and the material resulting by this treatment is then compounded with the olefinic crosslinking agent.

It has been found that the cross-linking agent may be advantageously combined with unsaturated polyesters prepared in accordance with these methods while the unsaturated polyester is at an elevated temperature and that the olefinic cross-linking agent may also be at an elevated temperature, thereby facilitating solution and mixing. To prevent premature polymerization at this stage, a polymerization inhibitor is advantageously added to the mixture, or preferably to one of its components prior to mixing. Alternatively, or in addition to including a polymerization inhibitor, a catalyst and/or promotor for the copolymerization may be added.

The following examples are given to illustrate a preferred procedure of preparing the chlorinated polyester resin.

EXAMPLE I

Fifty-two and eight-tenths parts of ethylene glycol and 90 parts of diethylene glycol are charged into an esterification or resin vessel provided with heating and/or cooling means, an agitator, means for maintaining an atmosphere of an inert gas over the reaction mixture, means for removing water of esterification, temperature recording means, charging inlets and outlets, etc. The charge is blanketed with an inert atmosphere of nitrogen, agitated, heated to a temperature between about 80 to 100 degrees centigrade, then 394.7 parts of 1,4,5,6,7,7-hexachlorobicyclo-(2.2.1)-5-heptene-2,3-dicarboxylic anhydride (hereinafter referred to as HET), prepared by the method which involves the Diels-Alder reaction of hexachlorocyclopentadiene with maleic anhydride, are blended into the agitated glycols. Seventy and eight-tenths parts of maleic anhydride are then blended into the charged reactants while the reaction mixture is being raised to a temperature of about 160 to 170 degrees centigrade by application of external heat. The water of esterification liberated during the reaction is separated and periodically measured and the acid number of the reaction mixture is also periodically measured to determine the progress of the reaction. When an acid number of approximately 55 is approached, 3.6 parts of tetrahydrofurfuryl alcohol are added to the reaction mixture. Upon reaching an acid number of about 45, the entire contents of the reaction vessel is cooled, then cast into pans under an inert atmosphere. A transparent, faintly colored, hard, brittle soluble material, having 38.4 percent by weight chlorine content, which melts in a temperature range above room temperature and below 100 degrees centigrade and has a specific gravity at room temperature of about 1.45 is obtained.

EXAMPLE II

One hundred grams of the cast product recovered in Example I is broken into small lumps, then added in small portions, with agitation, to 30 grams of monostyrene maintained under an inert atmosphere, containing 0.03 gram of hydroquinone, until completely dissolved. Complete solution consumes a period of more than 24 hours even with continued vigorous agitation. The resulting mixture is a clear, substantially colorless solution having a viscosity of about 30 poises at 25 degrees centigrade on a Gardner bubble viscometer.

The non-chlorinated resins which have been found to be suitable in preparing the novel laminates of the invention comprise unsaturated polyester resins prepared by the reaction of an ethylenically unsaturated polycarboxylic acid and a polyhydric alcohol. The resins may be used per se or in conjunction with reactive unsaturated monomers having in their structure the group $>C=C<$.

The ethylenically unsaturated alpha, beta dicarboxylic acids which may be employed in accordance with this invention include maleic acid, fumaric acid, maleic anhydride, itaconic acid, itaconic anhydride, citraconic acid, and citraconic anhydride. In preparing the polyester, up to 95% of the weight of the unsaturated acidic component may be replaced with one or more saturated dicarboxylic acids having from 2 to 10 carbon atoms per molecule, the carboxyl groups being located at the end of the chains and no other reactive groups being present thereon. Examples of such acids include succinic acid, adipic acid, sebacic acid, phthalic anhydride or the like.

The polyhydric alcohols which are suitable for use in accordance with this invention include those aliphatic alcohols having no other reactive groups than the hydroxyl groups. Examples of suitable alcohols include ethylene glycol, glycerol, pentaerythritol, propylene glycol, diethylene glycol, 1,5-pentanediol and triethylene glycol. Mixtures of polyhydric alcohols also may be employed and in some cases epoxides may be used in place of glycols, particularly in reaction with dicarboxylic acids instead of their anhydrides. Castor oil also may be employed in reactions with maleic anhydride. The polyhydric alcohol should be employed, with respect to the total amount of the acidic components, in a molar equivalent ±10%.

The polyester resins are prepared by reacting the acidic components and the polyhydric alcohol in accordance with usual esterification procedures. For example, the acidic components and the polyhydric alcohol are heated under reflux in the presence of an esterification catalyst such as hydrochloric acid, sulphuric acid, benzene sulfonic acid or the like. Removal of water formed in the reaction to increase the degree of esterification may advantageously be effected by utilizing azeotropic distillation as, for example, by carrying out the reaction in the presence of a volatile organic liquid such as toluene, xylene or the like.

Examples of liquid reactive unsaturated monomers having the group $>C=C<$ which may be employed in this invention include monostyrene, vinyl toluene, alphamethylstyrene, 2,4-dichlorostyrene, paramethyl styrene, vinyl acetate, methyl methacrylate, ethyl acrylate, diallyl phthalate, diallyl succinate, diallyl maleate, allyl alcohol, methallyl alcohol, acrylonitrile, methyl viny ketone, diallyl ether, vinylidene chloride, butyl methacrylate, allyl acrylate, allyl crotonate, 1,3-chloroprene and divinyl benzene, as well as mixtures of two or more of any of these monomers.

To illustrate more fully the preparation of the non-chlorinated resins employable in the invention, the following examples are set forth. The parts and percentages given are by weight unless otherwise indicated.

EXAMPLE III

A mixture of 3910 grams (11 moles) of 2,2-bis-[para-hydroxyethoxyphenyl] propane and 1090 grams (10 moles) of maleic anhydride are reacted while being sparged with carbon dioxide in a closed vessel at a temperature of 200° C. until the mixture has an acid number of 25. The mixture then is cooled and 0.008% hydroquinone, based on the weight of the initial mixture of ingredients, is added at a temperature of 160° C.

EXAMPLE IV

A mixture of 44 mol percent of adipic acid and 6 mol percent of fumaric acid is combined with 50 mol percent of propylene glycol and reacted with carbon dioxide sparging for a period of about 4 hours at a temperature of 140° C. in a closed reaction vessel. The temperature then is raised to 220° C. over a 4-hour period, and the reaction continued at that temperature for an additional 8 hours. A syrupy polyester resin is obtained.

EXAMPLE V

A composition comprising the reaction product of 10 mol percent of maleic anhydride, 40 mol percent of adipic acid, and 50 mol percent of diethylene glycol is prepared according to the procedure described in Example IV.

In preparing laminates of the novel resinous compositions of the invention, a polymerization catalyst is preferably employed to effect setting or curing. Catalysts such as benzoyl peroxide, acetyl peroxide, lauroyl peroxide, methyl ethyl ketone peroxide, etc. have been found satisfactory. The catalyst is used in a proportion of up to about 2% by weight of the total resin composition. In some instances, the catalyst may be mixed as, for example, with tricresyl phosphate.

The resinous composition also preferably contains a filler material such as one or more of the metal oxides as, for example, antimony oxide, and aluminum oxide trihydrate, barium oxide, etc. as well as other inert fillers including clays, calcium oxalate, and the like materials. The filler may constitute up to about 60% or more by weight of the resin composition and will preferably contain a major proportion of alumina trihydrate, i.e., about 80–98% of the filler.

The following examples, given for the purpose of illustration only, describe the use of the novel resin compositions in the production of the improved laminates. In each instance, two plies of 1.5 oz. glass mat are impregnated with the resin composition. The laminates are cured between platens at 125° C. to form sheets 0.075 inch thick. The samples are tested for flame resistance by Method 2023.2 of Federal Specification L-P-406b, as issued on September 25, 1952, and modified by the NEMA Switchgear Assemblies Tech. Comm., Subcommittee VIII, on Flammability Testing, on August 26, 1957.

The samples are tested for Dust and Fog Tracking Resistance according to Appendix V, ASTM Stds. on Electrical Insulating Materials, September 1957.

EXAMPLE VI

Resin: Percent by weight
Chlorinated polyester of Example I _____ 11.25
Non-chlorinated resin of Example III _____ 36.90
Benzoyl peroxide in tricresyl phosphate ____ 0.56
Fillers:
Alumina trihydrate _____ 40.30
Antimony oxide _____ 2.89
Monomer:
Styrene _____ 3.60
Methyl methacrylate _____ 4.50

EXAMPLE VII

Resin: Percent by weight
Chlorinated polyester of Example I _____ 8.20
Non-chlorinated polyester containing about
  10% of methyl methacrylate _____ 33.00
Benzoyl peroxide _____ 0.40
Fillers:
Alumina trihydrate _____ 53.10
Antimony oxide _____ 2.00
Monomer:
Styrene _____ 3.30

EXAMPLE VIII

Resin: Percent by weight
Chlorinated polyester prepared from tetrachloro phthalic anhydride _____ 29.70
Non-chlorinated polyester of Example IV containing 10% acrylic monomer _____ 29.70
Benzoyl peroxide in tricresyl phosphate ____ 0.60
Fillers:
Alumina trihydrate _____ 29.80
Calcium oxalate _____ 8.50

EXAMPLE IX

Resin: Percent by weight
Chlorinated polyester of Example VIII _____ 23.14
Non-chlorinated polyester of Example VIII __ 23.14
Fillers:
Alumina trihydrate _____ 46.30
Antimony oxide _____ 2.32
Monomer:
Styrene _____ 2.32
Alpha methylstyrene _____ 2.32

The dust-fog tracking resistance and flame resistance of the samples are given in the following table. Adequate tracking resistance is considered to be a minimum of 200 hours. Flame test requirements are a minimum of 90 seconds ignition time and 100 seconds maximum burning time as determined by the previously mentioned NEMA method.

*Table I*

| Example No | Tracking Resistance, Hrs. | Flame Resistance | |
|---|---|---|---|
| | | Ignition Time, Seconds | Burning Time, Seconds |
| VI | 220 | 93 | 51 |
| VII | 332 | 136 | 25 |
| VIII | 328 | 103 | 45 |
| IX | 238 | 133 | 80 |

From the foregoing description, it will be apparent that the invention provides a novel resinous electrical insulation which represents a decided advance in the art. Laminates embodying the novel resinous composition are characterized by outstanding resistance to tracking and erosion and are also greatly improved over prior art articles in their self-extinguishing properties.

We claim as our invention:

1. A resinous laminate comprising at least two sheets of glass fabric embedded in and bonded together by a resinous material having the composition derived by reacting, in which all parts are by weight:

Parts
(A) Chlorinated polyester resin _____ 8–35
(B) Non-chlorinated polyester resin _____ 20–35
(C) Acrylic monomer _____ 2–10
(D) Catalyst _____ 0.4–2.0 together with up to about 60% by weight of the resinous material of a filler containing a major proportion of alumina trihydrate, and said laminate characterized by improved tracking and flame resistance.

2. A resinous laminate comprising at least two sheets of glass fabric embedded in and bonded together by a resinous material having the composition derived by reacting, in which all parts are by weight:

Parts
(A) Chlorinated polyester resin _____ 8–35
(B) Non-chlorinated polyester resin _____ 20–35
(C) Monomer _____ 2–10
(D) Catalyst _____ 0.4–2.0 together with up to about 60% by weight of the resinous material of a filler containing a major proportion of alumina trihydrate, and said laminate characterized by improved tracking and flame resistance.

3. A resinous laminate comprising at least two sheets of glass fabric embedded in and bonded together by a resinous material having the composition derived by reacting, in which all parts are by weight:

Parts
(A) Chlorinated polyester resin prepared by reacting tetrachloro phthalic anhydride and a polyhydric alcohol _____ 8–35
(B) Non-chlorinated polyester resin _____ 20–35
(C) Monomer _____ 2–10
(D) Catalyst _____ 0.0–2.0 together with up to about 60% by weight of the resinous material of a filler containing a major proportion of alumina trihydrate, and said laminate characterized by improved tracking and flame resistance.

4. A resinous composition characterized by improved electrical insulating properties comprising (1) the reaction product of the formulation, in which all parts are by weight:

| | Parts |
|---|---|
| (A) Chlorinated polyester resin | 8–35 |
| (B) Non-chlorinated polyester resin | 20–35 |
| (C) Monomer | 2–10 |
| (D) Catalyst | 0.0–2.0 | and (2) up to about 60% by weight of (1) of a filler containing a major proportion of alumina trihydrate, said resinous composition having improved resistance to tracking and being self-extinguishing.

5. A resinous composition characterized by improved electrical insulating properties comprising the reaction product of the formulation, in which all parts are by weight, of (1) about 8–35 parts of a chlorinated polyester resin prepared from a material selected from the group consisting of adducts of hexahalocyclopentadiene and a tetrahalo phthalic anhydride, about 20–35 parts of a non-chlorinated unsaturated polyester resin, about 2–10 parts of an ethylenically unsaturated monomer, and up to about 2 parts of a polymerization catalyst; and (2) up to about 60% by weight of (1) of a filler containing a major proportion of alumina trihydrate.

References Cited by the Examiner

UNITED STATES PATENTS 2,779,700  1/57  Robitschek et al. _____ 154—43
2,931,746  4/60  Robitschek _____ 154—43

EARL M. BERGERT, *Primary Examiner.*

C. F. KRAFFT, *Examiner.*